United States Patent
Taori et al.

(10) Patent No.: US 8,867,427 B2
(45) Date of Patent: Oct. 21, 2014

(54) COMMUNICATION SYSTEM USING HIERARCHICAL MODULATION SCHEME OR NETWORK CODING SCHEME

(75) Inventors: Rakesh Taori, Suwon-si (KR); Seung Woo Ko, Bukjeju-gun (KR); Jung Min Park, Seoul (KR); Mi-Sun Do, Suwon-si (KR); Seong-Lyun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1330 days.

(21) Appl. No.: 12/500,515

(22) Filed: Jul. 9, 2009

(65) Prior Publication Data
US 2010/0008288 A1 Jan. 14, 2010

(30) Foreign Application Priority Data
Jul. 10, 2008 (KR) .................. 10-2008-0067026

(51) Int. Cl.
 H04B 7/14 (2006.01)
 H04B 7/155 (2006.01)
 H04L 1/00 (2006.01)
(52) U.S. Cl.
 CPC ........ H04B 7/15521 (2013.01); H04B 7/15557 (2013.01); H04L 1/0077 (2013.01)
 USPC ....................................... 370/315
(58) Field of Classification Search
 USPC .......... 370/315, 316, 400, 252; 455/88, 414.3
 See application file for complete search history.

(56) References Cited

U.S. PATENT DOCUMENTS

| | | | | |
|---|---|---|---|---|
| 7,724,698 B2 * | 5/2010 | Morris et al. | ................. | 370/316 |
| 8,224,302 B2 * | 7/2012 | Moride | ................. | 455/414.3 |
| 8,228,835 B2 * | 7/2012 | Yuan et al. | ................. | 370/315 |
| 2007/0254604 A1 * | 11/2007 | Kim | ................. | 455/88 |
| 2008/0025323 A1 * | 1/2008 | Khan | ................. | 370/400 |
| 2009/0097432 A1 * | 4/2009 | Kwon et al. | ................. | 370/315 |
| 2009/0185521 A1 * | 7/2009 | Li et al. | ................. | 370/315 |
| 2011/0026429 A1 * | 2/2011 | Slimane et al. | ................. | 370/252 |

FOREIGN PATENT DOCUMENTS

| | | |
|---|---|---|
| JP | 2006-254155 | 9/2006 |
| KR | 10-2007-0080265 | 8/2007 |
| KR | 10-2007-0109519 | 11/2007 |
| WO | WO 2005/067173 | 7/2005 |

* cited by examiner

*Primary Examiner* — Mark Rinehart
*Assistant Examiner* — Gbemileke Onamuti
(74) *Attorney, Agent, or Firm* — NSIP Law

(57) ABSTRACT

A communication system using a hierarchical modulation scheme and/or a network coding scheme is provided. A relay node included in the communication system may generate a relay packet by applying a network coding scheme to a hierarchically modulated source packet and to a destination packet received from a destination node. The relay packet is transmitted to a source node and a destination node, and the source node and the destination node may extract a desired packet from a relay packet. The communication system also may adaptively determine an optimal communication mode.

35 Claims, 10 Drawing Sheets

COMMUNICATION SYSTEM USING HIERARCHICAL MODULATION SCHEME OR NETWORK CODING SCHEME

CROSS-REFERENCE TO RELATED APPLICATION

This application claims the benefit under 35 U.S.C. §119(a) of a Korean Patent Application No. 10-2008-0067026, filed on Jul. 10, 2008 in the Korean Intellectual Property Office, the disclosure of which is incorporated herein by reference in its entirety.

BACKGROUND

1. Field

The following description relates to a communication system. More particularly, the description relates to a communication system using a modulation scheme and a coding scheme.

2. Description of the Related Art

Currently, various communications schemes are used to achieve a high data transmission rate. However, the bit error rate increases as the data transmission rate increases when transmission power is limited. In addition, shadow zones may increase in urban areas as high frequency bands are used.

A relay station is required to solve problems due to shadow zones and to reduce the bit error rate, when the data transmission rate is increased.

However, the addition of a relay station to a communication system requires additional wireless resources because an additional time slot allocation is required for the relay station. As an example, when the relay station receives a message from a source node in a time slot and transmits the message to a destination node, two time slots are required. In other words, a single time slot is required by the source node to directly transmit the message to the relay station and another time slot is required for the relay station to transmit the message to a destination node. Consequently, when the relay station is added to the communication system, additional wireless resources are required for the relay station, overall performance of the communication system may be diminished.

SUMMARY

In one general aspect, a communication apparatus for a relay node includes a packet receiving unit to receive a source packet transmitted from a source node and a destination packet transmitted from a destination node, the source packet being hierarchically modulated with respect to at least two sub source packets; a packet generation unit to generate a relay packet by applying a network coding scheme on the source packet and the destination packet; and a packet transmission unit to transmit the relay packet to both the source node and the destination node.

The packet generation unit may be configured to generate the relay packet by coding at least one of the at least two sub source packets and by coding the destination packet according to the network coding scheme.

The packet receiving unit may be configured to receive the source packet during a first time slot, and to receive the destination packet during a second time slot, which is different from the first time slot.

The packet transmission unit may be configured to transmit the relay packet in a third time slot, which is different from the first and second time slots. The packet transmission unit also may be configured to transmit the relay packet to both the source node and the destination node during the same time slot.

The hierarchically modulated source packet may be hierarchically modulated with respect to the at least two sub source packets according to statuses of links formed between the source node, the relay node, and the destination node.

The destination packet may be configured to be extracted from the relay packet using the source packet, and the source packet may be configured to be extracted from the relay packet using the destination packet. The destination packet also may be hierarchically modulated with respect to at least two sub destination packets, and the packet generation unit may be configured to generate the relay packet using at least one of the at least two sub source packets and at least one of the at least two sub destination packets.

In another general aspect, a communication method implemented by a source node apparatus of a communications system includes generating a source packet by a source packet generator of the source node apparatus by hierarchically modulating at least two sub source packets; transmitting the source packet from a transmitter of the source node apparatus to a relay node and a destination node; receiving from the relay node at a receiver of the source node apparatus, a relay packet generated by applying a network coding scheme to a destination packet transmitted from the destination node and to at least one of the at least two sub source packets; and extracting, by an extraction unit of the source node apparatus, the destination packet from the received relay packet.

Generating the source packet may comprise performing a hierarchical modulation with respect to the at least two sub source packets according to statuses of links formed between the source node, the relay node, and the destination node.

Extracting the destination packet may comprise extracting the destination packet from the received relay packet using at least one of the at least two sub source packets.

In another general aspect, a communication method for a communications system including a base station, a relay station, and a terminal, includes receiving a source packet transmitted from the base station to the relay station and the terminal during a first time slot; receiving a destination packet transmitted from the terminal to the relay station during a second time slot, which is different from a first time slot; generating a relay packet by the relay station by applying a network coding scheme to the source packet and the destination packet and transmitting, the relay packet from the relay station to both the base station and the terminal during a third time slot, which is different from the first and second time slot.

In another general aspect, a communication system controlling method includes determining a communication mode based on at least one of statuses of links formed between a source node, a relay node, and a destination node and a complexity of the communication system and distances between the source node, the relay node, and the destination node; selecting at least one of a normal mode, a hierarchical modulation mode, a network coding mode, and a hierarchical modulation-network coding mode based on the determined communication mode; transmitting the selected mode to the source node, the relay node, and the destination node; and communicating using the selected mode.

Communicating in the normal mode may comprise transmitting, by the relay node, a source packet of the source node to the destination node and a destination packet of the destination node to the source node. Communicating in the hierarchical modulation mode may comprise transmitting, by the source node, a source packet, generated by performing a hierarchical modulating with respect to at least two sub source packets, to both the relay node and the destination node. Communicating in the network coding mode may comprise transmitting, by the relay node, a relay packet, generated by coding the source packet and the destination packet according to a network coding scheme, to the source node and the destination node. Communicating in the hierarchical modulation-network coding mode may comprise transmitting, by the source node, a source packet, generated by performing a hierarchical modulation with respect to at least two sub source packets, to both the relay node and the destination node and transmitting, by the relay node, a relay packet, generated by coding the source packet and the destination packet according to the network coding scheme, to both the source node and destination node.

Determining the communication mode may comprise pre-storing a plurality of communication modes corresponding to a plurality of possible statuses of the links formed between the source node, the relay node, and the destination node in a memory; and comparing an actual status of the links formed between the source node, the relay node, and the destination node to the plurality of pre-stored communication modes respectively corresponding to the plurality of possible statuses of the links in the memory.

In another general aspect, a communication network for transmitting and receiving packets using a data frame including a first subframe, a network coding subframe, and a second subframe, includes a source node configured to transmit a source packet in the first subframe, the source packet being generated by performing hierarchical modulating with respect to at least two sub source packets, a relay node configured to receive the source packet and a destination and to transmit a relay packet in the network coding subframe, the relay packet being generated by coding the source packet and the destination packet according to a network coding scheme, and a destination node configured to receive the source packet and the relay packet and to transmit the destination packet to the relay node in the second subframe.

The relay node may configured to extract at least one sub source packet of the at least two sub source packets from the source packet and to generate the relay packet by coding the extracted at least one sub source packet and the destination packet according to the network coding scheme in the network coding subframe.

The source node and the relay node may be configured to receive the relay packet, the source node is configured to detect the destination packet from the relay packet, and the destination node may be configured to detect at least one sub source packet of the at least two sub source packets from the relay packet.

In another general aspect, a communication method for a relay node includes receiving a source packet transmitted from a source node and a destination packet transmitted from a destination node, the source packet generated by performing a hierarchical modulation with respect to at least two sub source packets; generating a relay packet by applying a network coding scheme on the source packet and the destination packet; and transmitting the relay packet to the source node and the destination node.

Generating the relay packet may comprise coding the destination packet and at least one of the at least two sub source packets according to the network coding scheme.

In another general aspect, a computer-readable storage medium storing a program to provide a communication protocol for a source node, includes instructions to cause a computer to receive a source packet transmitted from a source node and a destination packet transmitted from a destination node, the source packet generated by performing a hierarchical modulation with respect to at least two sub source packets; generate a relay packet by applying a network coding scheme on the source packet and the destination packet; and transmit the relay packet to the source node and the destination node.

Other features will be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity and convenience.

DETAILED DESCRIPTION OF EMBODIMENTS

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, descriptions of well-known functions and constructions may be omitted for increased clarity and conciseness.

Figure 1:
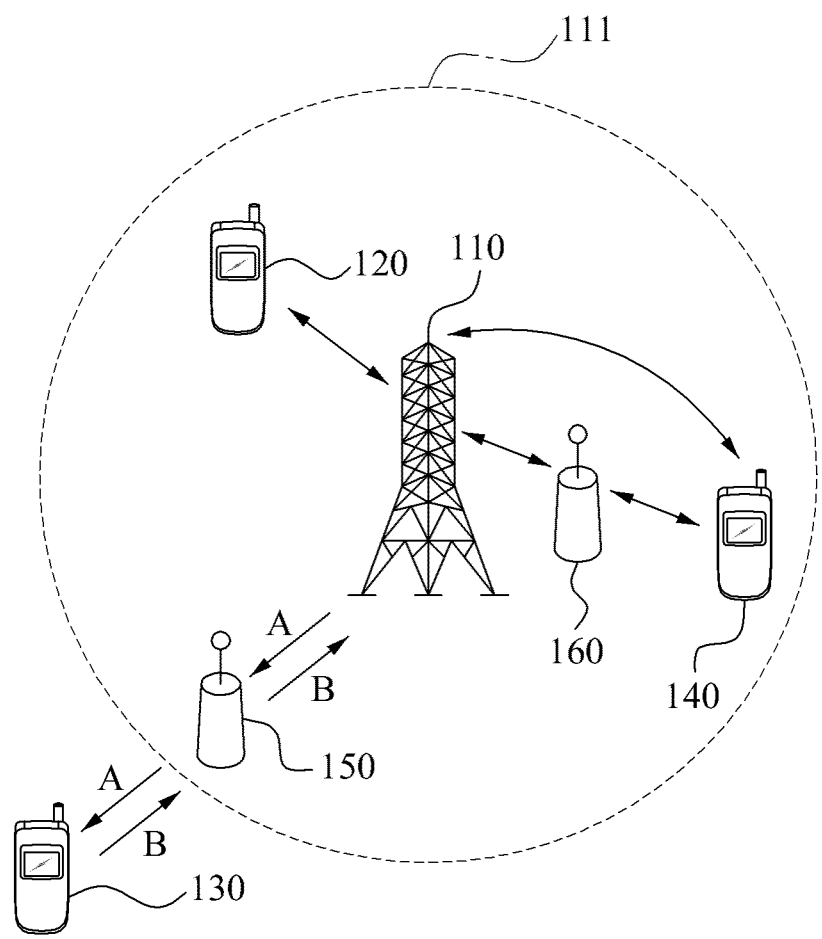
FIG. 1 is a diagram illustrating an example of a communication system including a base station, relay stations, and terminals.

FIG. 1 illustrates an example of a communication system including a base station, relay stations, and terminals. The communication system may include a base station 110, a plurality of terminals 120, 130, and 140, and a plurality of relay stations 150 and 160. The base station 110 has a predetermined cell coverage area 111.

Since the cell coverage area 111 of the base station 110 includes the terminal 120, the base station 110 and the terminal 120 may directly transmit/receive packets. Although the terminal 140 is included in the cell coverage area 111 of the base station 110, the base station 110 and the terminal 140 may transmit/receive packets via the relay station 160. In this case, the base station 110, the terminal 140, and the relay station 160 may independently or cooperatively transmit/ receive packets. That is, in an uplink, the relay station 160 may independently transmit a packet of the terminal 140 to the base station 110 and also transmit a particular packet to the base station 110 by cooperating with the terminal 140.

The terminal 130 may be required to transmit/receive packets to the base station 110 via the relay station 150 since the terminal 130 is outside the cell coverage area 111 of the base station 110.

In a communication system according to a Time Division Duplex ("TDD") scheme, the base station 110 may transmit packets to the terminals 120, 130, and 140 and the relay stations 150 and 160 during a downlink time slot. The terminals 120, 130, and 140 and the relay stations 150 and 160 may transmit packets to the base station 110 during an uplink time slot.

In the communication system according to the TDD scheme, the downlink time slot may be divided into a first time slot and a second time slot. During the first time slot, the base station 110 directly transmits packets to the terminals 120 and 140. During the second time slot, the base station 110 transmits packets to the relay stations 150 and 160. The uplink time slot may be divided into a third time slot and a fourth time slot. During the third time slot, the terminals 120 and 140 directly transmit packets to the base station 110. During the fourth time slot when the relay stations 150 and 160 transmit packets to the base station 110.

Conceptually, four time slots are used to transmit/receive packets (A, B) by the base station 110 and the terminal 130 via the relay station 150 for the example illustrated in FIG. 1. For example, the base station 110 may transmit a packet A to the relay station 150 during a T1 time slot. The terminal 130 may transmit a packet B to the relay station 150 during a T2 time slot. Here, the relay station 150 may transmit the packet A to the terminal 130 during a T3 time period and transmit the packet B to the base station 110 during a T4 time period. As a result, four time slots T1, T2, T3, and T4 are used to transmit/receive the packets A and B between the base station 110 and the terminal 130 via the relay station 150.

As described below, the base station 110 and the terminal 130 may exchange the packets A and B using three time slots using a network coding scheme. Therefore, the data transmission rate may be improved since the wireless resources are used more effectively. The network coding scheme also may be applicable when at least two or more relay stations exist between a base station and a terminal.

Figure 2:
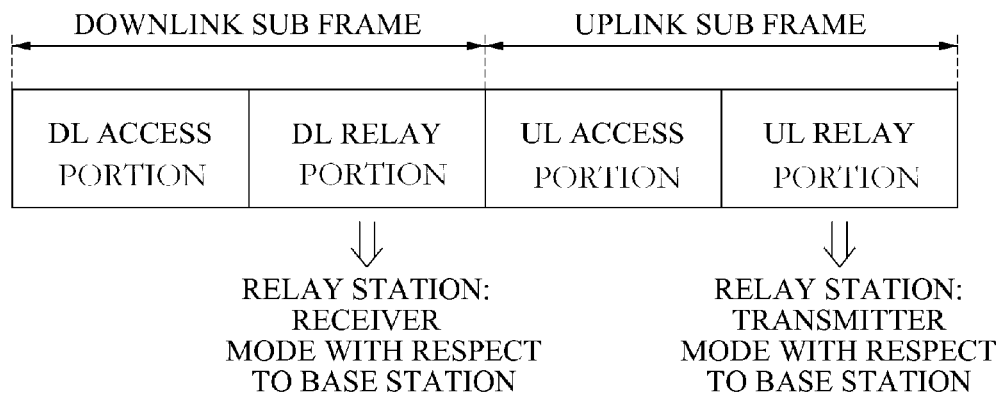
FIG. 2 is a diagram illustrating an example of a data frame for a base station and a relay station.

FIG. 2 illustrates an example of a data frame used by a base station and a relay station. The data frame for the base station may include a downlink (DL) subframe and an uplink (UL) subframe. In this case, the DL subframe may include a DL access portion and a DL relay portion. The base station may directly transmit packets to a terminal using the DL access portion and transmit packets to the relay station using the DL relay portion.

The data frame for the base station also may include the UL subframe. In this instance, the UP subframe may include a UL access portion and a UL relay portion. The terminal may directly transmit packets to the base station using the UL access portion, and the relay station may transmit packets to the base station using UL relay portion.

The relay station may transmit packets to the terminal using the DL access portion of the data frame, and the relay station may operate in a receiver mode with respect to the base station.

The relay station may receive packets transmitted from the terminal using the UL access portion of the data frame and transmit the packets to the base station using the UL relay portion. The relay station may operate in a transmitter mode with respect to the base station.

Figure 3:
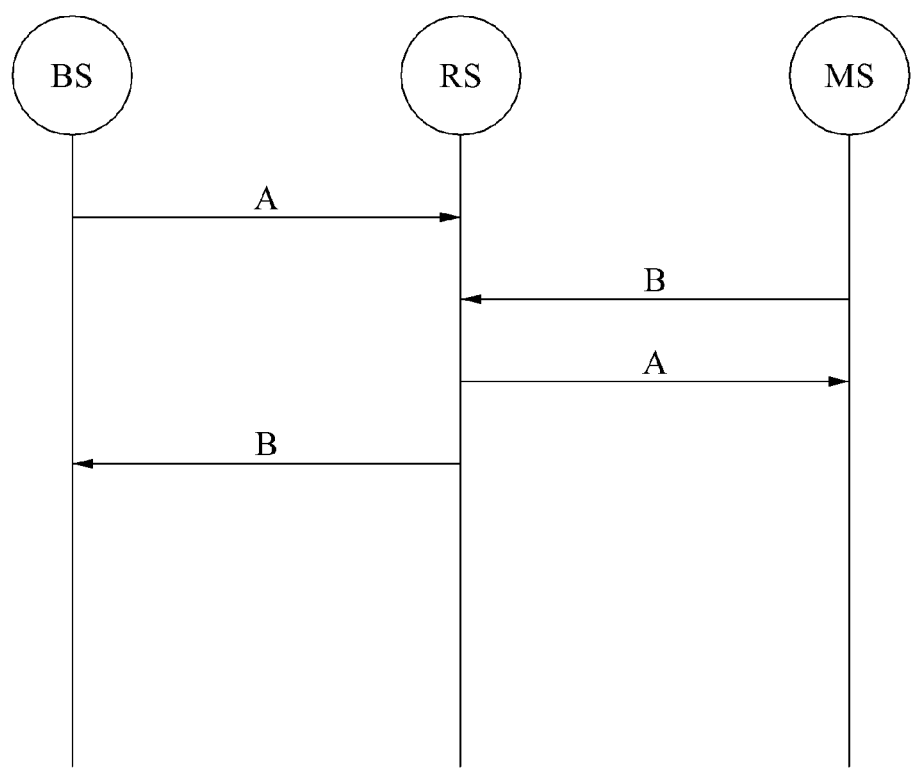
FIG. 3 is a diagram illustrating an example of a flow of packets transmitted/received between a base station, a relay station, and a terminal.

FIG. 3 illustrates an example of the flow of packets transmitted/received by a base station, a relay station, and a terminal. In a communication system according to a TDD scheme, a relay station may receive a packet A transmitted from a base station. After the relay station receives the packet A, the relay station may receive a packet B transmitted from a terminal.

The relay station may transmit the packet A received from the base station to the terminal. After the relay station transmits the packet A to the terminal, the relay station may transmit the packet B to the base station.

As a result, four time slots are used to receive the packet B by the base station and to receive the packet A by the terminal. That is, four time slots are used, such as a time slot during which the base station transmits the packet A to the relay station, a time slot during which the terminal transmits the packet B to the relay station, a time slot during which the relay station transmits the packet A to the terminal, and the time slot during which the relay station transmits the packet B to the base station.

Network Coding Scheme

As illustrated in FIG. 1, FIG. 2, and FIG. 3, the communication system including the base station, the relay station, and the terminal uses four time slots to exchange packets between the base station and the terminal via the relay station. In this case, using four time slots may be an ineffective use of wireless resources.

However, a communication system using a network coding scheme described herein reduces a number of required time slots, and thereby uses wireless resources more effectively.

Figure 4:
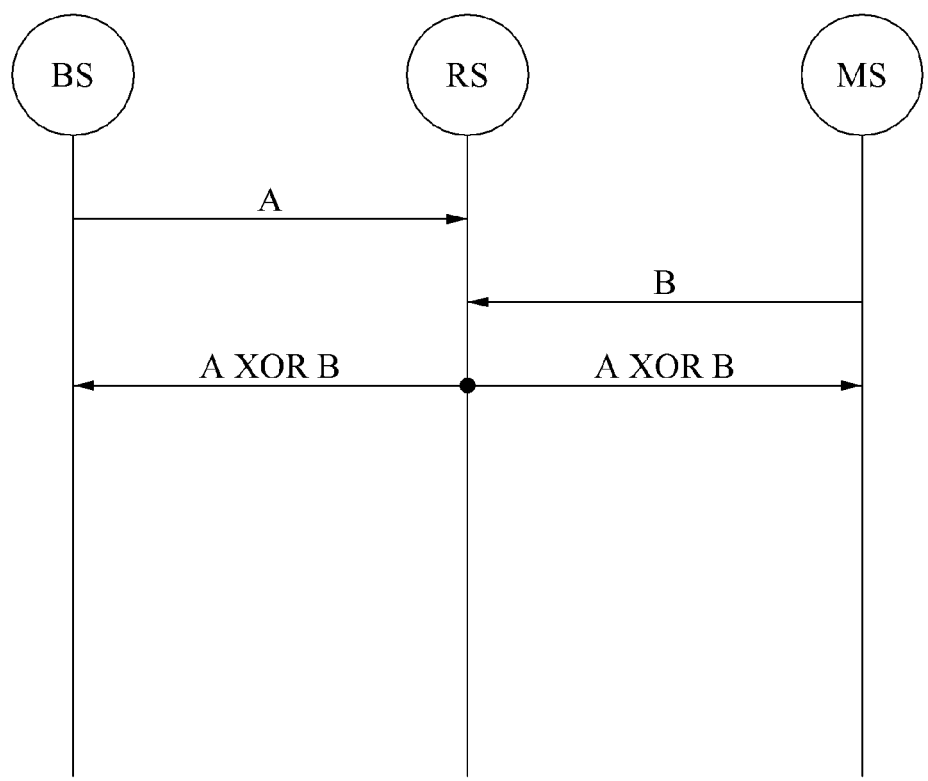
FIG. 4 is a diagram illustrating an example of a flow of packets transmitted/received between a base station, a relay station, and a terminal using a network coding scheme.

FIG. 4 illustrates an example of a flow of packets transmitted/received in a base station, a relay station, and a terminal using a network coding scheme. The relay station may receive a packet A transmitted from the base station in a first time slot and receive a packet B transmitted from the terminal in a second time slot. In this instance, the relay station may code the packets A and B and generate a relay packet A XOR B using a network coding scheme. For example, the relay station may decode the packets A and B, encode the decoded packets A and B using various channel codes, thereby generating the relay packet A XOR B.

The relay station may simultaneously transmit the generated relay packet A XOR B to the base station and the terminal in a third time slot. In this case, since the base station is already aware of the packet A, the base station may extract the packet B from the relay packet A XOR B. Likewise, the terminal may extract the packet A from the relay packet A XOR B since the terminal is already aware of the packet B.

Consequently, a first time slot, a second time slot, and a third time slot are required to transmit the packet A to the terminal via the relay station and to receive the packet B from the terminal via the relay station. A The number of required time slots may be reduced by transmitting the relay packet A XOR B generated using the network coding scheme in the relay station to transmit the relay packet to the base station and the terminal.

Figure 5:
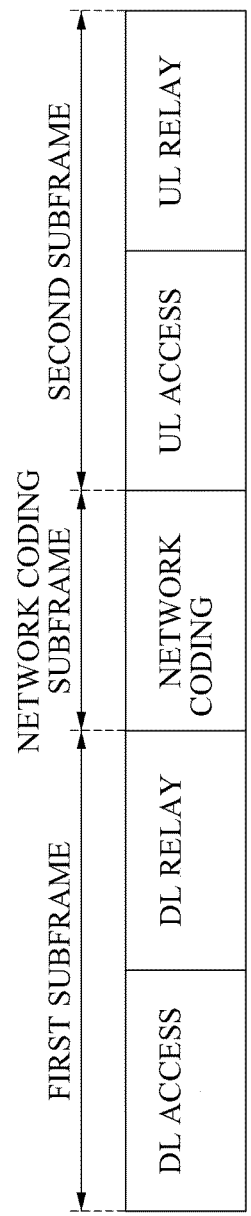
FIG. 5 is a diagram illustrating an example of a data frame of a communication system using a network coding scheme.

FIG. 5 illustrates an example of a data frame of a communication system using the network coding scheme described herein. The data frame may include a first subframe, a network coding subframe, and a second subframe.

A base station may directly transmit/receive packets with a terminal included in a cell coverage using a DL access portion of the first subframe. The base station also may transmit packets to the relay station using a DL relay portion.

The relay station may generate a relay packet by coding the packets transmitted from the base station and the terminal according to the network coding scheme and transmit the generated relay packet to both the base station and the terminal using a network coding portion. The base station and the terminal may extract packets, which are desired by the base station and the terminal, from the relay packet included in the network coding portion.

The base station may directly receive packets transmitted from the terminal using the UL access portion of the second subframe and receive packets transmitted from the relay station using the UL relay portion.

Hierarchical Modulation Scheme

Figure 6:
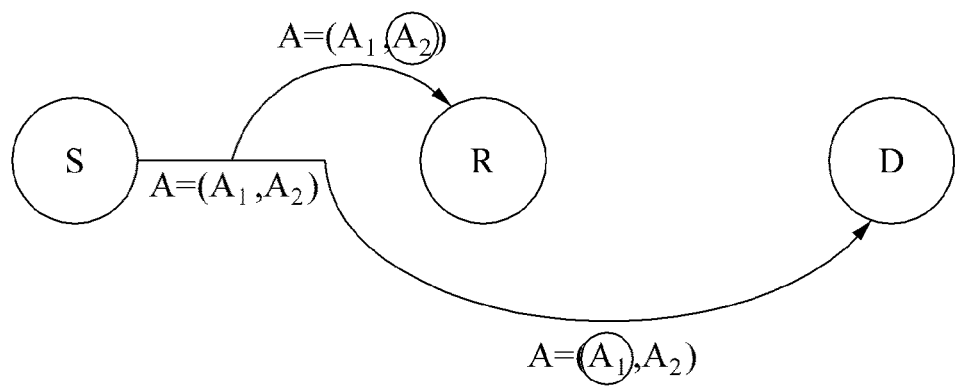
FIG. 6 is a diagram illustrating an example of a source node transmission of a hierarchical-modulated packet to a relay node and a destination node.

FIG. 6 illustrates an example of a transmission of a hierarchically-modulated packet from a source node to both a relay node and a destination node. Links are formed between the source node, the destination node, and the relay node. Since distances from the source node to the relay node and the source node to the destination node are different, a status of a link between the source node and the relay node and a status of a link between the source node and the destination node may be different from each other. Since the distance from the source node to the destination node is greater than the distance from the source node to the relay node, the status of the link between the source node and the destination node may be generally inferior to the status of the link between the source node and the relay node.

Since the status of the link between the destination node and the source node is inferior, the destination node may receive symbols having a lower modulation order. Since the status of the link between the relay node and the source node is superior, the relay node may receive symbols having a higher modulation order. Here, the symbols having the lower modulation order may indicate the symbols are relatively far away from each other, and the symbols having the higher modulation order may indicate the symbols are relatively close to each other.

In this instance, the source node may perform a hierarchical modulation with respect to a sub source packet A1 for the destination node and a sub source packet A2 for the relay node, thereby generating a source packet A for both the destination node and the relay node. For example, the source node may apply a modulation scheme having a relatively higher modulation order on the relay node having the superior link, and apply a modulation scheme having the relatively lower modulation order on the relay node having an inferior link.

The source node may transmit information for each of the destination node and the relay node by transmitting the single source packet A. That is, since the source packet A hierarchically modulated by the source node includes information related to the sub source packets A1 and A2, the relay node and the destination node may extract the sub source packets A1 and A2 from the source packet A.

Figure 7:
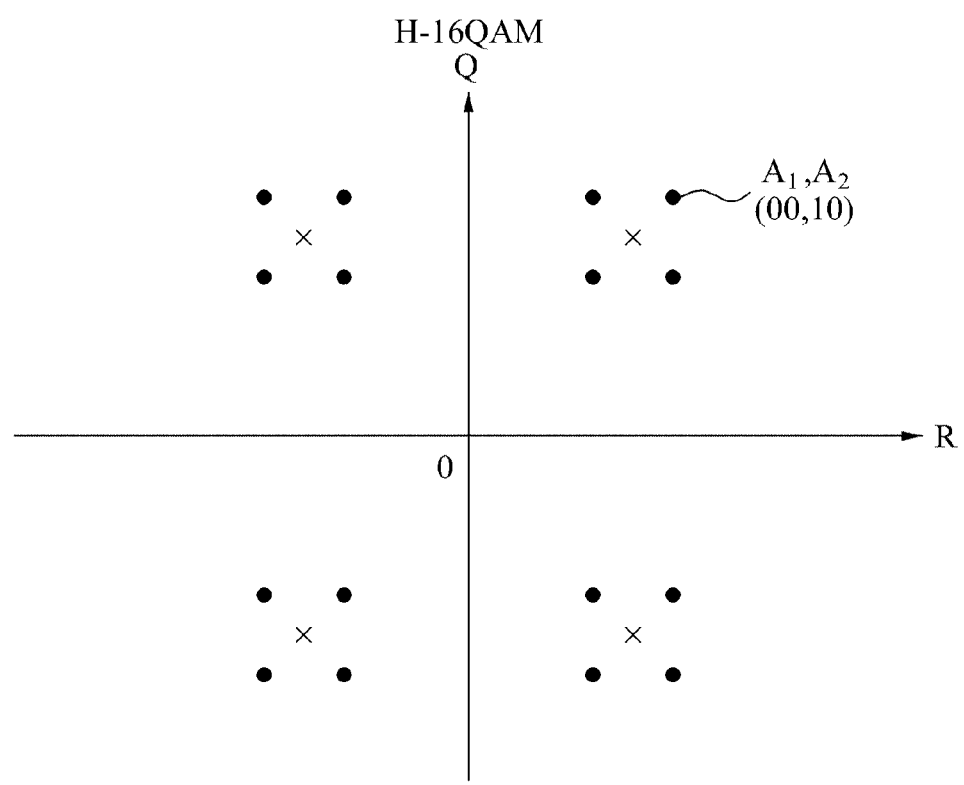
FIG. 7 is a diagram illustrating an example of a constellation diagram for hierarchical modulation.

FIG. 7 illustrates an example constellation diagram of a hierarchical modulation. Sixteen dots and four x's are illustrated in FIG. 7, a source packet A of four bits is determined to be any one of the sixteen dots. When the source node generates a source packet A according to the constellation diagram in FIG. 7, since the source packet A may be modulated according to 16-QAM in general, such modulation scheme may be referred to as a hierarchical modulation-16 QAM (H-16QAM).

Here, it is assumed that a source packet of four bits A=(A1, A2)=(00, 10), whose source node is hierarchically modulated, is transmitted to a relay node and a destination node. Since the destination node has an inferior link, an accurate location of the source packet A may be difficult to determine. However, the destination node may be easily determined to be the two-bit sub source packet A1 since the destination node is 00 (binary) based on the source packet A and because it is not difficult for the destination node to determine that the quadrant where the source packet A exists is the first quadrant. Since the relay node has a superior link to the destination node and may determine a relatively accurate location of the source packet A, the relay node may determine that the two-bit sub source packet A2 is 10 (binary) for the relay node based on the source packet A.

Therefore, although the source node transmits the single source packet A whose source node is hierarchically modulated to the relay node and the destination node, the relay node and the destination node may extract the sub source packets A1 and A2 from the source packet A.

With reference to FIGS. 6 and 7, although an example of the source node performing hierarchical modulation with respect to two sub source packets is described, this scheme also may be generally applied to other configurations. For example, more than two sub source nodes may be hierarchically modulated, and the number of bits of sub source packets may vary.

Hierarchical Modulation-network Coding

A communication system may simultaneously adopt a hierarchical modulation scheme and a network coding scheme. As an example, when the communication system consists of a source node—relay node—destination node configuration, the source node may generate a source packet by applying the hierarchical modulation scheme and transmit the source packet to the relay node and the destination node. Therefore, the communication system may handle the case when a status of a link between the source node and the relay node, is different from a status of a link between the source node and the destination node, and performance of the communication system may be enhanced using the hierarchical modulation scheme. Also, the communication system may effectively use wireless resources, for example, time resources, by using the network coding scheme.

Figure 8:
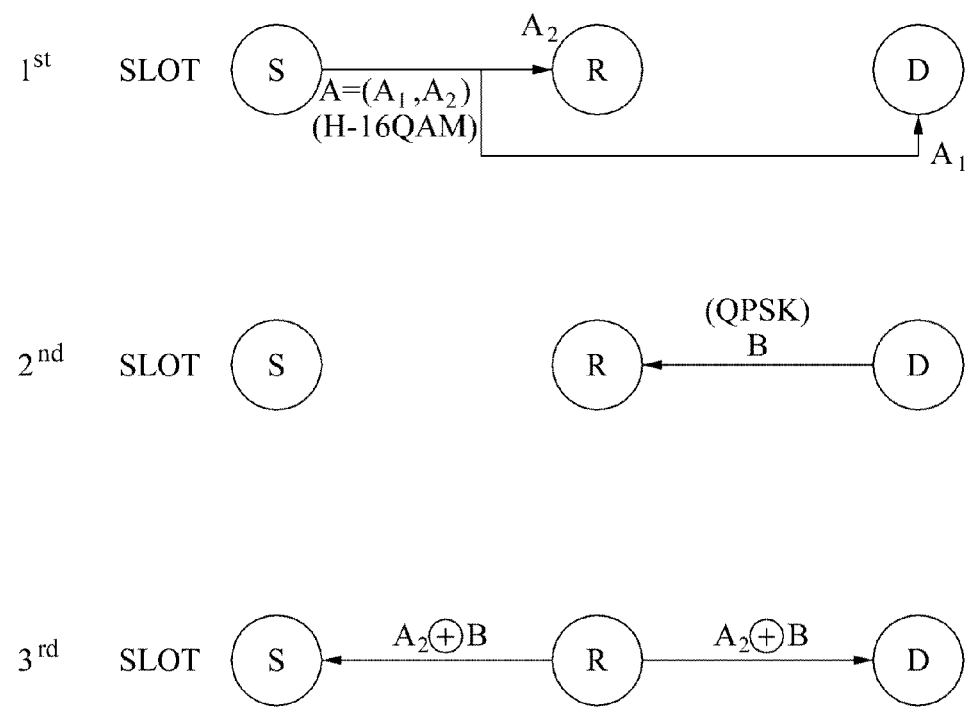
FIG. 8 is a diagram illustrating an example of operations of a source node, a relay node, and a destination node in time slots.

FIG. 8 illustrates exemplary operations of a source node, a relay node, and a destination node in time slots. In a $1^{st}$ time slot, the source node transmits a hierarchically modulated source packet A to both the relay node and the destination node. Here, the source packet A is generated by performing hierarchical modulation with respect to a sub source packet A1 for the destination node and a sub source packet A2 for the relay node. In FIG. 8, the source packet A is hierarchically modulated according to the hierarchical (H)-16QAM scheme. In this case, the relay node may extract the sub source packet A2 from the source packet A and the destination node may extract the sub source packet A1 from the source packet A.

In a $2^{nd}$ time slot, the destination node transmits a destination packet B to the relay node and the destination packet is modulated according to a QPSK scheme.

In a $3^{rd}$ time slot, the relay node transmits a relay packet A2⊕B to both the source node and the destination node. The relay packet A2⊕B may be generated by coding the sub source packet A2 and the destination packet B according to the network coding scheme, as described above. In this case, the relay node may broadcast or multicast the relay packet A2⊕B to both the source node and the destination node during the same time slot.

Since the source node is already aware of the sub source packet A2, the source node may easily extract the destination packet B from the relay packet A2⊕B. Similarly, since the destination node is already aware of the destination packet B, the destination node may easily extract the sub source packet A2 from the relay packet A2⊕B. As a result, during all three time slots, the destination node may receive the sub source packets A1 and A2, and the source node may receive the destination packet B.

Although FIG. 8 illustrates an example where the source packet A is hierarchically modulated according to the H-16QAM scheme and the destination packet B is modulated according to the QPSK scheme, various modulation schemes may be used depending on the status of links of the source node and the destination node.

Control of Communication Mode

The communication system may include a communication mode controlling apparatus to control a communication mode. Here, the communication mode may include at least one of a normal mode, a network coding mode, a hierarchical modulation mode, and a hierarchical modulation-network coding mode. The communication mode controlling apparatus may be installed in any one of a source node, a destination node, and a relay node. However, it is possible to omit at least one of the normal mode, the network coding mode, the hierarchical modulation mode, and the hierarchical modulation-network coding mode. That is, without the normal mode, for example, any one of the network coding mode, the hierarchical modulation mode, and the hierarchical modulation-network coding mode may be determined to be the communication mode.

The normal mode is a basic operation mode of a communication system including a relay node. The communication system does not perform hierarchical modulation and network coding in the normal mode. Therefore, similar to operations of a generic relay station, the relay node may transmit the destination packet or the source packet to the destination node or the source node according to a "decode and forward" scheme or an "amplify and forward" scheme in the normal mode.

In the hierarchical modulation mode, at least one of the source node or the destination node does not perform the hierarchical modulation. In this case, the relay node does not perform the network coding. That is, when the source node performs the hierarchical modulation, the source node transmits the source packet, generated by performing the hierarchical modulation with respect to at least two hierarchical sub source packets, to both the relay node and the destination node, and the relay node transmit the source packets (or "sub source packets") to the destination node according to the decode and forward scheme or amplify and forward scheme without performing network coding.

In the network coding mode, the communication system performs network coding, but does not perform hierarchical modulation. That is, the relay node generates a relay packet by coding the source packet and the destination packet according to the network coding scheme, and transmits the generated relay packet to both the source node and the destination node. Here, the source packet and the destination packet are not hierarchically modulated.

In the hierarchical modulation-network coding mode, the communication system simultaneously performs network coding and hierarchical modulation. As an example, the source node generates a source packet by performing hierarchical modulation with respect to at least two sub source packets, and transmits the generated source packet to both a relay node and a destination node. The relay node generates a relay packet by coding the source packet and the destination packet according to the network coding scheme, and transmits the generated relay packet to both the source node and the destination node.

Figure 9:
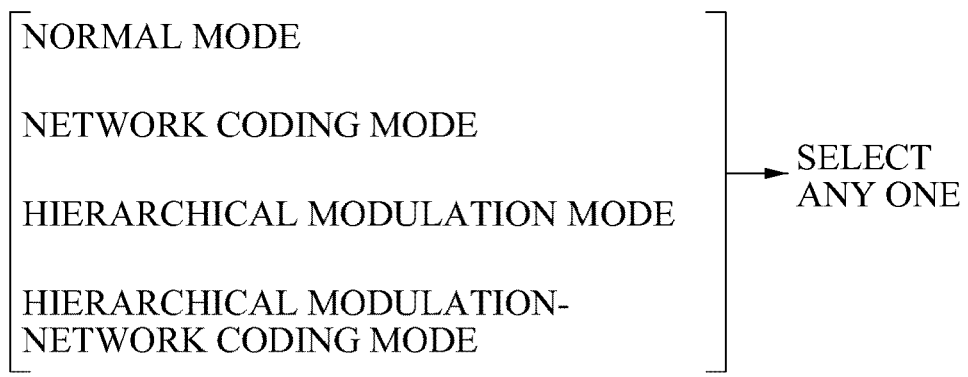
FIG. 9 is a diagram illustrating an example of a communication mode.

FIG. 9 illustrates another example of a communication mode. A communication mode controlling apparatus may determine any one of a normal mode, a network coding mode, a hierarchical modulation mode, and a hierarchical modulation-network coding mode as the communication mode.

The communication mode controlling apparatus may pre-store in a memory the communication mode corresponding to possible statuses of the links. Here, for example, the links are formed between a source node, a relay node, and a destination node. The communication mode controlling apparatus may pre-store the communication mode according to the status of each link so that a data transmission rate may be maximized based on a result of a virtual test performed in advance or when a usage of wireless resources is maximized.

The communication mode controlling apparatus also may determine the status of actual links and use the memory to determine the communication mode based on the determined status of a link. In this case, the communication mode controlling apparatus may adaptively control the communication mode according to status of an actual link.

The communication mode controlling apparatus also may transmit information related to the selected communication mode to the source node, the relay node, and the destination node, and the source node, the relay node, and the destination node may determine the selected communication mode based on such information.

Also, the communication mode controlling apparatus may determine the communication mode based on at least one of a complexity of the communication system and the distances between the source node, the relay node, and the destination node.

Figure 10:
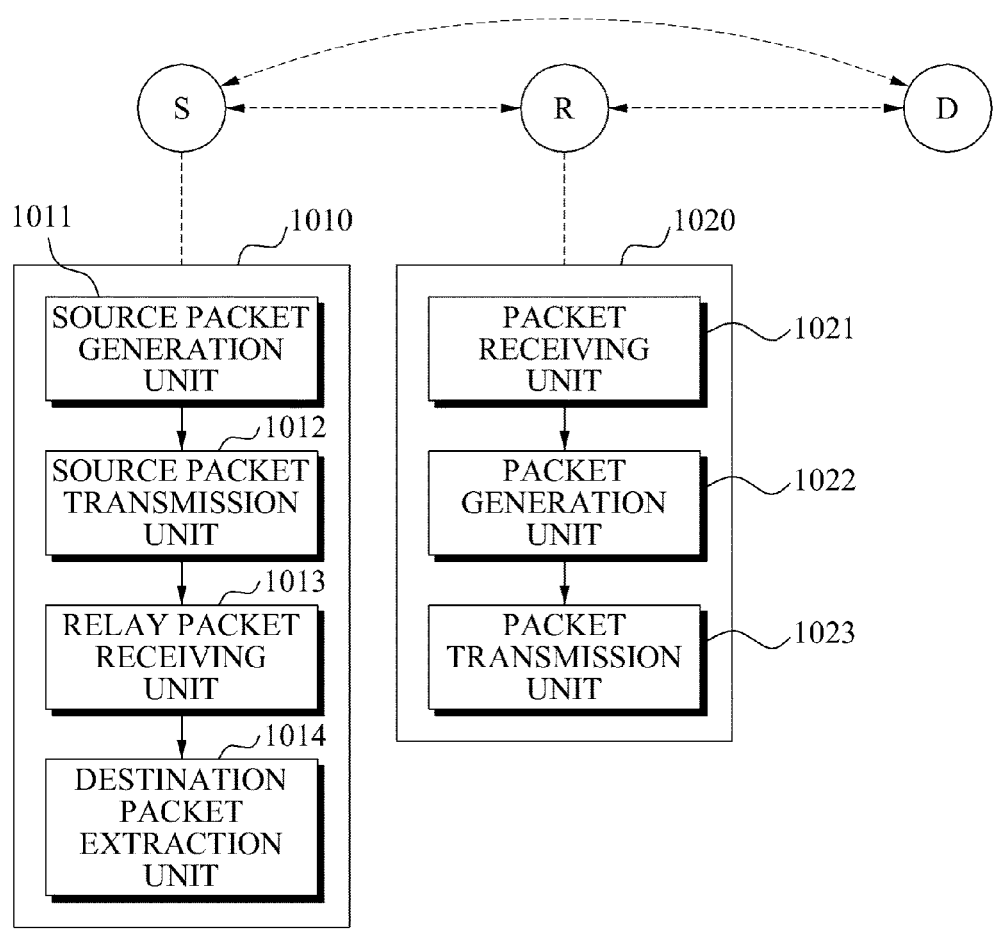
FIG. 10 is a diagram illustrating an example of a source node, a relay node, and a destination node.

FIG. 10 illustrates an example of a source node (S), a relay node (R), and a destination node (D). A communication apparatus 1010 for the source node (S) may include a source packet generation unit 1011, a source packet transmission unit 1012, a relay packet receiving unit 1013, and a destination packet extraction unit 1014.

The source packet generation unit 1011 may generate a source packet by performing a hierarchical modulation with respect to at least two sub source packets. In this case, the source packet generation unit 1011 may generate the source packet by performing hierarchical modulation with respect to the at least two sub source packets according to the statuses of the links formed between the source node, the relay node, and the destination node.

The source packet transmission unit 1012 may transmit the source packet to both the relay node and the destination node. In this case, the relay node may generate the relay packet by applying a network coding scheme to the destination packet transmitted from the destination node and at least one of the at least two sub source packets.

The relay packet receiving unit 1013 may receive a relay packet from the relay node.

The destination packet extraction unit 1014 may extract the destination packet from the received relay packet. In this case, the destination packet extraction unit 1014 may extract the destination packet from the received relay packet using at least one of the at least two sub source packets.

A communication apparatus 1020 may include a packet receiving unit 1021, a packet generation unit 1022, and a packet transmission unit 1023. The packet receiving unit 1021 may receive the source packet transmitted from the source node and the destination packet transmitted from the destination node. Here, the source packet is generated by performing hierarchical modulation with respect to the at least two sub source packets. In this case, the packet receiving unit 1021 may receive the source packet during a first time slot and may receive the destination packet during a second time slot different from the first time slot.

The packet generation unit 1022 may generate the relay packet by applying a network coding scheme on the source packet and the destination packet. In this case, the packet generation unit 1022 may generate the relay packet by coding the destination packet and at least one sub source packet of the at least two sub source packets according the network coding scheme.

The packet transmission unit 1023 may transmit the relay packet to both the source node and the destination node. In this case, the packet transmission unit 1023 may transmit the relay packet in a third time slot different from the first and second time slot.

The communication apparatus for the source node, the relay node, and the destination node may use a specific data frame. Here, the specific data frame may include a first subframe, a network coding subframe, and a second subframe. In the first subframe, the source node may transmit the source packet, generated by performing the hierarchical modulation with respect to at least two sub source packets, to the relay node and the destination node. In the network coding subframe, the relay node may transmit the relay packet, generated by coding the source packet and the destination packet according to the network coding scheme, to the source node and the destination node. In the second subframe, the destination node may transmit the destination packet to the relay node.

Although it is not illustrated in FIGS. 1-9, a communication system controlling method may include determining a communication mode based on the statuses of links formed between a source node, a relay node, and a destination node, where the communication mode includes at least one of a normal mode, a hierarchical modulation mode, a network coding mode, and a hierarchical modulation-network coding mode, and transmitting information related to the determined communication mode to the source node, the relay node, and the destination node. Here, determining the communication mode may include pre-storing in a memory the communication mode which corresponds to the possible statuses of the links and determining the communication mode based on an actual status of the links using the memory.

A communication method for a source node also may include generating a source packet by performing hierarchical modulation with respect to at least two sub source packets; transmitting the source packet to a relay node and a destination node; receiving a relay packet from the relay node, where the relay node generates the relay packet by applying a network coding scheme on a destination packet transmitted from the destination node and applies the network coding scheme on at least one of the at least two sub source packets; and extracting the destination packet from the received relay packet.

A communication method for a relay node also may include receiving a source packet transmitted from a source node and a destination packet transmitted from a destination node, where the source packet is generated by performing a hierarchical modulation with respect to at least two sub source packets; generating a relay packet by applying a network coding scheme on the source packet and the destination packet; and transmitting the relay packet to the source node and the destination node.

The above-described methods may be recorded, or fixed in one or more computer-readable media that includes program instructions to be implemented by a computer to cause a processor to execute or perform the program instructions. The media may also include, independent or in combination with the program instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the methods and/or operations described above.

A relay node may effectively use wireless resources since a relay packet is generated by applying a network coding scheme on a source packet and a destination packet.

Performance of a communication system may be enhanced since a hierarchically modulated source packet is transmitted from a source node to both a relay node and a destination node and the relay packet generated according to a network coding scheme is transmitted to both the source node and the destination node.

A communication system also may effectively use wireless resources and enhance performance of the communication system by adaptively determining a communication mode.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication apparatus for a relay node, the apparatus comprising:
   a packet receiving unit configured to receive a source packet transmitted from a source node and a destination packet transmitted from a destination node, the source packet being hierarchically modulated with respect to at least two sub source packets, and the at least two sub source packets comprising at least a source-relay packet and a source-destination packet;
   a packet generation unit configured to generate a relay packet by applying a network coding scheme on the source packet and the destination packet; and
   a packet transmission unit configured to transmit the relay packet to both the source node and the destination node, wherein
   the packet receiving unit is configured to extract at least the source-relay packet excluding the source-destination packet from the source packet.

2. The apparatus of claim 1, wherein the packet generation unit is configured to generate the relay packet by coding at least one of the at least two sub source packets and by coding the destination packet according to the network coding scheme.

3. The apparatus of claim 1, wherein the packet receiving unit is configured to receive the source packet during a first time slot, and to receive the destination packet during a second time slot, which is different from the first time slot.

4. The apparatus of claim 3, wherein the packet transmission unit is configured to transmit the relay packet in a third time slot, which is different from the first and second time slots.

5. The apparatus of claim 1, wherein the packet transmission unit is configured to transmit the relay packet to both the source node and the destination node during the same time slot.

6. The apparatus of claim 1, wherein the hierarchically modulated source packet is hierarchically modulated with respect to the at least two sub source packets according to statuses of links formed between the source node, the relay node, and the destination node.

7. The apparatus of claim 1, wherein the destination packet is hierarchically modulated with respect to at least two sub destination packets, and the packet generation unit is configured to generate the relay packet using at least one of the at least two sub source packets and at least one of the at least two sub destination packets.

8. The apparatus of claim 1, wherein the network coding scheme is a logical operation with respect to operands of data of the source packet and data of the destination packet.

9. The apparatus of claim 8, wherein the logical operation is an exclusive-OR operation.

10. The apparatus of claim 1, wherein the relay packet is generated such that the destination packet is extracted from the relay packet using the source packet and the source packet is extracted from the relay packet using the destination packet.

11. A communication method implemented by a source node apparatus of a communications system, the method comprising:
    generating a source packet by a source packet generator of the source node apparatus by hierarchically modulating at least two sub source packets, the at least two sub source packets comprising at least a source-relay packet and a source-destination packet;
    transmitting the source packet from a transmitter of the source node apparatus to a relay node and a destination node;
    receiving from the relay node at a receiver of the source node apparatus, a relay packet generated by applying a network coding scheme to a destination packet transmitted from the destination node and to at least the source-relay packet excluding the source-destination packet extracted from the source packet; and
    extracting, by an extraction unit of the source node apparatus, the destination packet from the received relay packet.

12. The method of claim 11, wherein generating the source packet comprises performing a hierarchical modulation with respect to the at least two sub source packets according to statuses of links formed between the source node, the relay node, and the destination node.

13. The method of claim 11, wherein extracting the destination packet comprises extracting the destination packet from the received relay packet using at least one of the at least two sub source packets.

14. The method of claim 11, wherein the source node extracts data of the destination packet using data of the source packet and the relay packet.

15. The method of claim 11, wherein data of the destination packet is extracted by applying a logical operation to operands of data of the source packet and data of the relay packet.

16. The apparatus of claim 15, wherein the logical operation is an exclusive-OR operation.

17. A communication method for a communications system including a base station, a relay station, and a terminal, the method comprising:
    receiving a source packet transmitted from the base station to the relay station and the terminal during a first time slot;
    receiving a destination packet transmitted from the terminal to the relay station during a second time slot, which is different from the first time slot, the source packet being hierarchically modulated with respect to at least two source brackets, and the at least two sub source packets comprising at least a source-relay packet and a source-destination packet;
    generating a relay packet by the relay station by applying a network coding scheme to the destination packet and at least the source-relay packet excluding the source-destination packet extracted from the source packet; and
    transmitting, the relay packet from the relay station to both the base station and the terminal during a third time slot, which is different from the first and second time slots.

18. The method of claim 17, wherein the network coding scheme is a logical operation with respect to operands of data of the source packet and data of the destination packet.

19. The method of claim 18, wherein the logical operation is an exclusive-OR operation.

20. The method of claim 17, wherein the relay packet is generated such that data of the destination packet is extracted from the relay packet using data of the source packet and the data of the source packet is extracted from the relay packet using the data of the destination packet.

21. A communication system controlling method, the method comprising:
    determining a communication mode based on at least one of statuses of links formed between a source node, a relay node, and a destination node and a complexity of the communication system and distances between the source node, the relay node, and the destination node;
    selecting at least one of a normal mode, a hierarchical modulation mode, a network coding mode, and a hierarchical modulation-network coding mode based on the determined communication mode;
    transmitting information related to the selected mode to the source node, the relay node, and the destination node so that the source node, the relay node, and the destination node determine the selected mode based on the information; and
    communicating using the selected mode.

22. The method of claim 21, wherein:
    communicating in the normal mode comprises transmitting, by the relay node, a source packet of the source node to the destination node and a destination packet of the destination node to the source node;
    communicating in the hierarchical modulation mode comprises transmitting, by the source node, a source packet, generated by performing a hierarchical modulation with respect to at least two sub source packets, to both the relay node and the destination node;
    communicating in the network coding mode comprises transmitting, by the relay node, a relay packet, generated by coding the source packet and the destination packet according to a network coding scheme, to the source node and the destination node; and
    communicating in the hierarchical modulation-network coding mode comprises transmitting, by the source node, a source packet, generated by performing a hierarchical modulation with respect to at least two sub source packets, to both the relay node and the destination node and transmitting, by the relay node, a relay packet, generated by coding the source packet and the destination packet according to the network coding scheme, to both the source node and destination node.

23. The method of claim 21, wherein determining the communication mode comprises:
pre-storing a plurality of communication modes corresponding to a plurality of possible statuses of the links formed between the source node, the relay node, and the destination node in a memory; and
comparing an actual status of the links formed between the source node, the relay node, and the destination node to the plurality of pre-stored communication modes respectively corresponding to the plurality of possible statuses of the links in the memory.

24. A communication network for transmitting/receiving packets using a data frame including a first subframe, a network coding subframe, and a second subframe, the network comprising:
a source node configured to transmit a source packet in the first subframe, the source packet being generated by performing hierarchical modulating with respect to at least two sub source packets, the at least two sub source packets comprising at least a source-relay packet and a source-destination packet;
a relay node configured to receive the source packet and a destination packet, to extract at least the source-relay packet excluding the source-destination packet from the source packet, and to transmit a relay packet in the network coding subframe, the relay packet being generated by coding the extracted source packet and the destination packet according to a network coding scheme; and
a destination node configured to receive the source packet and the relay packet, and to transmit the destination packet to the relay node in the second subframe.

25. The system of claim 24, wherein the relay node is configured to extract at least one sub source packet of the at least two sub source packets from the source packet and to generate the relay packet by coding the extracted at least one sub source packet and the destination packet according to the network coding scheme in the network coding subframe.

26. The system of claim 24, wherein the source node and the relay node are configured to receive the relay packet, the source node is configured to detect the destination packet from the relay packet, and the destination node is configured to detect at least one sub source packet of the at least two sub source packets from the relay packet.

27. The network of claim 24, wherein the network coding scheme is a logical operation with respect to operands of data of the source packet and data of the destination packet.

28. The network of claim 27, wherein the logical operation is an exclusive-OR operation.

29. The network of claim 24, wherein the relay packet is generated such that data of the destination packet is extracted from the relay packet using data of the source packet and the data of the source packet is extracted from the relay packet using the data of the destination packet.

30. A communication method for a relay node, the method comprising:
receiving a source packet transmitted from a source node and a destination packet transmitted from a destination node, the source packet generated by performing a hierarchical modulation with respect to at least two sub source packets, and the at least two sub source packets comprising at least a source-relay packet and a source-destination packet;
extracting at least the source-relay packet excluding the source-destination packet from the source packet;
generating a relay packet by applying a network coding scheme on the extracted source packet and the destination packet; and
transmitting the relay packet to the source node and the destination node.

31. The method of claim 30, wherein generating the relay packet comprises coding the destination packet and at least one of the at least two sub source packets according to the network coding scheme.

32. A non-transitory computer-readable storage medium storing a program to provide a communication protocol for a source node, the medium comprising instructions to cause a computer to:
receive a source packet transmitted from a source node and a destination packet transmitted from a destination node, the source packet generated by performing a hierarchical modulation with respect to at least two sub source packets, and the at least two sub source packets comprising at least a source-relay packet and a source-destination packet;
extract at least the source-relay packet excluding the source-destination packet from the source packet;
generate a relay packet by applying a network coding scheme on the extracted source packet and the destination packet; and
transmit the relay packet to the source node and the destination node.

33. The medium of claim 32, wherein the network coding scheme is a logical operation with respect to operands of data of the source packet and data of the destination packet.

34. The medium of claim 33, wherein the logical operation is an exclusive-OR operation.

35. The medium of claim 32, wherein the relay packet is generated such that data of the destination packet is extracted from the relay packet using data of the source packet and the data of the source packet is extracted from the relay packet using the data of the destination packet.

* * * * *